United States Patent
Uribe et al.

(10) Patent No.: US 9,990,544 B1
(45) Date of Patent: Jun. 5, 2018

(54) DATA ACCURACY IN OCR BY LEVERAGING USER DATA AND BUSINESS RULES TO IMPROVE DATA ACCURACY AT FIELD LEVEL

(71) Applicant: Intuit Inc., Mountain View, CA (US)

(72) Inventors: Karla Julietta Uribe, Palo Alto, CA (US); Robert E. Bamford, San Diego, CA (US); Massimo Mascaro, San Diego, CA (US); Michael Miljour, San Diego, CA (US); Horace Chan, Edmonton (CA); Greg Coulombe, Sherwood Park (CA); Sheldon Porcina, Sherwood Park (CA); Carol Ann Howe, San Diego, CA (US); Kasey L. Matthews, San Diego, CA (US); Vitaliy Lee, San Diego, CA (US); Brian J. Chung, San Diego, CA (US); Varadarajan Sriram, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 5 days.

(21) Appl. No.: 15/086,407

(22) Filed: Mar. 31, 2016

(51) Int. Cl.
*G06K 9/00* (2006.01)
*G06Q 40/00* (2012.01)

(52) U.S. Cl.
CPC ....... *G06K 9/00469* (2013.01); *G06Q 40/123* (2013.12)

(58) Field of Classification Search
USPC .......................................................... 382/182
See application file for complete search history.

(56) References Cited

U.S. PATENT DOCUMENTS

| | | | |
|---|---|---|---|
| 8,792,751 B1* | 7/2014 | Eftekhari | G06K 9/033 382/112 |
| 9,317,745 B2* | 4/2016 | Smith | G06K 9/00469 |
| 9,390,419 B2* | 7/2016 | Kumar | |
| 2012/0020532 A1* | 1/2012 | Snow | G06K 9/036 382/112 |
| 2015/0117749 A1* | 4/2015 | Smith | G06K 9/00469 382/137 |
| 2015/0120548 A1* | 4/2015 | Smith | G06Q 20/407 705/44 |
| 2016/0049010 A1* | 2/2016 | Hinski | G06F 17/30011 345/633 |
| 2016/0379186 A1* | 12/2016 | Smith | G06Q 20/0425 705/45 |
| 2017/0147552 A1* | 5/2017 | Carroll | G06F 17/245 |
| 2017/0169077 A1* | 6/2017 | Reddy | G06F 17/30528 |
| 2017/0185837 A1* | 6/2017 | Kumar | G06K 9/00483 |

* cited by examiner

*Primary Examiner* — Jerome Grant, II
(74) *Attorney, Agent, or Firm* — Hawley Troxell Ennis & Hawley LLP; Philip McKay

(57) ABSTRACT

A method and system provides augmented OCR data to a user of a financial system. The method and system include receiving image data related to an image of a financial document of the user and generating OCR data based on the image data. The method and system further include receiving financial data related to the financial document, analyzing the financial document, and generating the augmented OCR data based on the OCR data and the financial data.

31 Claims, 3 Drawing Sheets

DATA ACCURACY IN OCR BY LEVERAGING USER DATA AND BUSINESS RULES TO IMPROVE DATA ACCURACY AT FIELD LEVEL

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems do not provide adequate real-time assistance to users.

For instance, users of traditional tax return preparation systems enter most of their data by hand. Entering data by hand often leads to inadvertent typing errors or other kinds of errors. Many traditional tax return preparation systems often do not provide any assistance at all when it comes to detecting errors in data entries made by users. Other traditional tax return preparation systems allow a user to upload an image of financial documents and perform optical character recognition (OCR) analysis on the image in order to automatically import data from the financial document. However, such OCR analysis is often littered with errors. In some cases, the OCR analysis fails to correctly recognize data entries. In other cases, the OCR analysis may leave many fields blank.

One reason that traditional financial systems do not provide adequate OCR recognition is due to the extremely large processing and storage resources needed to analyze large volumes of documents having large numbers of data entries.

When errors in OCR data are not caught quickly, or at all, there can be significant consequences to users. For example, a user may pay too much tax or a user may pay not enough tax and have late fees and/or other IRS penalties imposed. When errors are discovered, a user may have to redo and refile taxes for previous years as well.

Moreover, the types of drawbacks associated with traditional tax return preparation systems are found in other financial systems as well. For example, many people use electronic financial systems to manage personal investments, banking, loans, retirement plans, and even to make and stay within a budget. OCR errors in these systems can have very costly real world consequences to users. Yet, these typically rigid systems do not adequately provide improved OCR analysis.

What is needed is a method and system for providing augmented OCR analysis of financial documents that is quick and accurate without using unduly large processing and storage resources.

SUMMARY

Embodiments of the present disclosure address some of the shortcomings associated with traditional financial systems by providing methods and systems for generating augmented OCR data related to a financial document of a user based on analysis of both image data and financial data relevant to the financial document. In particular, embodiments of the present disclosure receive image data representing an image of the financial document and generate OCR data based on analysis of the image data. Embodiments of the present disclosure then receive and analyze financial data relevant to the financial document and generate augmented OCR data based on the OCR data and the financial data. By analyzing both the image data and relevant financial data, a financial system provides augmented OCR data with improved accuracy with respect to previous financial systems.

In one embodiment, the financial data is user related financial data associated with the user. The user related financial data can include an address of the user, a name of the user, a social security number of the user, bank account of the user, a marital status of the user, investment data of the user, retirement data of the user, property ownership data of the user, credit information of the user loan data of the user, a user identification of the user, income data of the user, tax return data of the user, names of a spouse or children of the user, an employer of the user, an address of the employer, expense data of the user, budgeting data of the user, or other types of financial data related to the user. The user related financial data can include data previously provided to the financial system by the user such as while preparing a previous year's tax return. Alternatively, the financial system can gather the user related financial data from associated financial systems that provide financial services to the user. The financial system can also gather the user related financial data from third party or public databases.

In one embodiment, the financial system analyzes the user related financial data and compares the OCR data to the user related financial data in order to detect possible errors or to fill vacant fields in the OCR data. For example, in an embodiment in which the financial system is a tax return preparation system, the user can capture an image of the user's W-2 form and provide the image data to the tax return preparation system. The financial system analyzes the image data related to the W-2 form and generates OCR data that identifies the fields of the W-2 form and the data in the fields of the W-2 form. The financial system then compares the OCR data to the user related financial data to ensure that the OCR data is compatible with the user related financial data. If the comparison indicates discrepancies between the OCR data and the user related financial data, the analytics module can generate augmented OCR data that adjusts the OCR data based on the comparison with the user related financial data.

According to an embodiment, the financial data can include historical financial data. The historical financial data can include data related to other users of the financial system or of other financial systems. The historical financial data can include data gathered from public or third party data sources.

The financial system can analyze the historical financial data in order to generate augmented OCR data. In particular, the financial system can compare the OCR data to the historical financial data in order to supply missing information, correct potential errors, determine a likelihood that the OCR data is correct, or provide a notification to the user of a possible error.

According to one embodiment, the financial system generates model data based on the historical financial data. The model data can be related to a financial model that can indicate likely financial characteristics of people sharing similar geographical, occupational, or other characteristics with the user. The financial system can compare the OCR data to the model data in order to generate the augmented OCR data. If portions of the OCR data do not align with the model data, the analytics module can generate augmented OCR data that adjusts the OCR data based on the comparison with the model data. The augmented OCR data can include corrections to the OCR data. Alternatively, the augmented OCR data can include notifications highlighting possible errors in the augmented OCR data. The user can then check to see that the augmented OCR data is correct.

In one embodiment, the financial data includes finance law data. The financial system compares the OCR data to the finance law data in order to sport possible errors in the OCR data or in the financial document. For example, the financial system can generate model data based on both finance law data and historical financial data. In an example in which the financial document includes a W-2 form of the user, the financial system may compare the OCR data to the model data and may find that Social Security withholdings were far too high in relation to the gross income. The financial system may then conclude that an error was made in analyzing the gross income field or the Social Security withholdings field of the image data. The financial system can then generate augmented OCR data that includes a notification that the user should check to see that the relevant fields of the augmented OCR data are correct.

According to one embodiment, the financial system is a personal financial management system. More particularly, the financial system can be a tax return preparation system or a system that manages one or more of banking, investments, loans, credit cards, real estate investments, retirement planning, bill pay, and budgeting. Embodiments of the present disclosure address some of the shortcomings associated with traditional financial systems that do not adequately provide OCR functionality to a user of a financial system.

A financial system in accordance with one or more embodiments provides augmented OCR data that is more reliable than in traditional systems by adjusting OCR data based on relevant financial data. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by analyzing OCR data and related financial data in order to generate augmented OCR data, users can save money and time and can better manage their wealth and taxes.

Using the disclosed embodiments of a method and system for providing augmented OCR data to users of a financial system, a method and system for providing augmented OCR data more accurately is provided. Therefore, the disclosed embodiments provide a technical solution to the long standing technical problems of detecting errors in OCR data and generating more accurate augmented OCR data for users of a financial system.

In addition, the disclosed embodiments of a method and system for providing augmented OCR data to users of a financial system are also capable of dynamically adapting to the needs of users of financial systems. Consequently, the disclosed embodiments of a method and system for providing augmented OCR data to users of a financial system also provide a technical solution to the long standing technical problem of static and inflexible financial systems.

The result is a much more accurate, adaptable, and robust, method and system to provide augmented OCR data to users of a financial system, but thereby serves to bolster confidence in electronic financial systems. This, in turn, results in: less human and processor resources being dedicated to analyzing electronic financial documents because more accurate and efficient analysis methods can be implemented, i.e., fewer processing and memory storage assets; less memory and storage bandwidth being dedicated to buffering and storing OCR data; less communication bandwidth being utilized to transmit financial data for analysis.

The disclosed method and system for providing augmented OCR data to users of a financial system does not encompass, embody, or preclude other forms of innovation in the area of generating OCR data in a financial system. In addition, the disclosed method and system for providing augmented OCR data to users of a financial system is not related to any fundamental economic practice, fundamental data processing practice, mental steps, or pen and paper based solutions, and is, in fact, directed to providing solutions to new and existing problems associated with using OCR technology in financial systems. Consequently, the disclosed method and system for providing augmented OCR data to users of a financial system, does not encompass, and is not merely, an abstract idea or concept.

Figure 1:
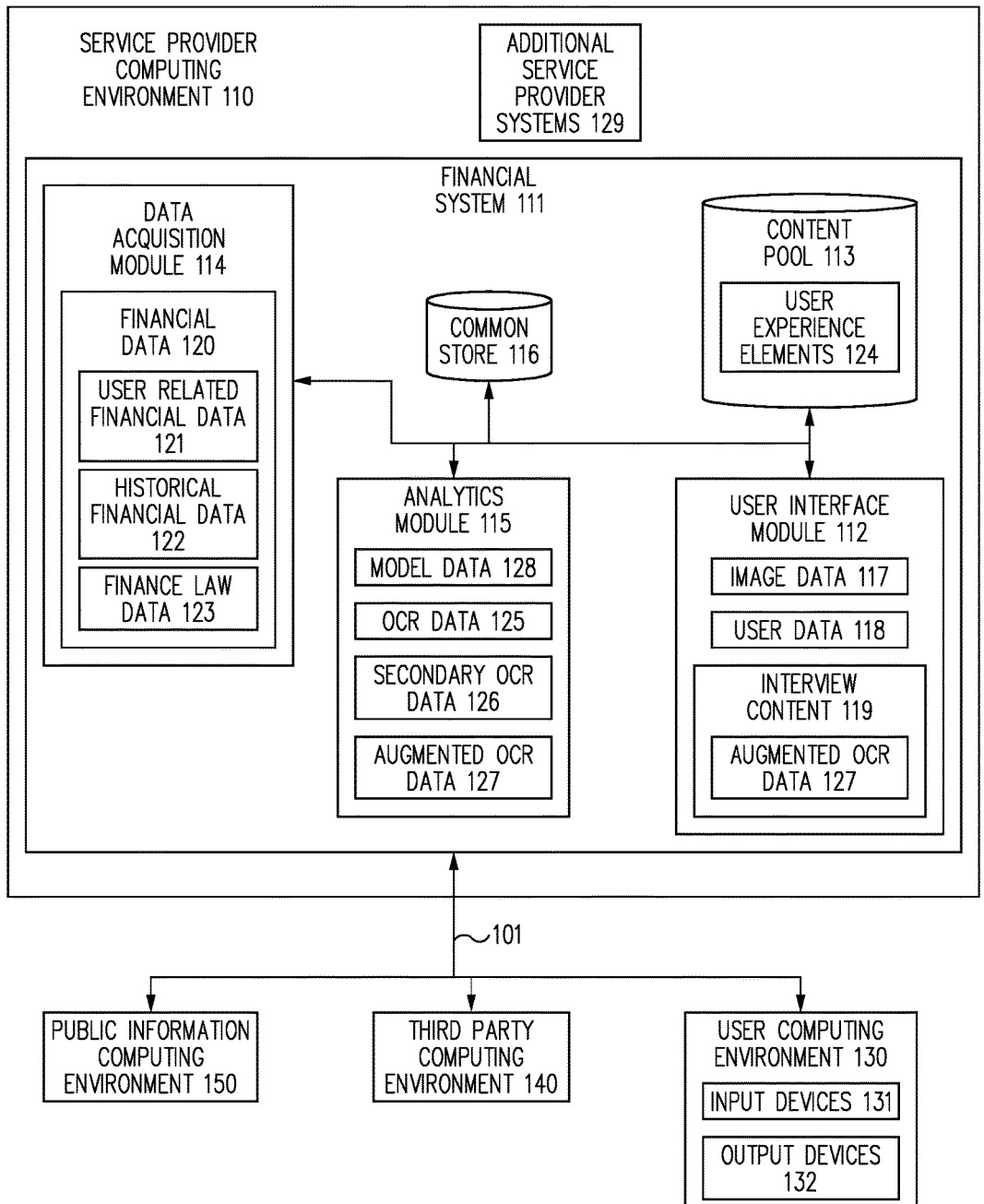
FIG. 1 is a block diagram of software architecture for providing augmented OCR data to a user of a financial system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed financial system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

Hardware Architecture

FIG. 1 illustrates a block diagram of a production environment 100 for providing augmented OCR data to a user of a financial system, according to one embodiment. Embodiments of the present disclosure provide methods and systems for providing augmented OCR data to a user of a financial system, according to one embodiment. In particular, embodiments of the present disclosure analyze OCR data and related financial data in order to generate more accurate augmented OCR data. By providing the augmented OCR data to the user, user confidence in the financial system is increased.

In addition, the disclosed method and system for providing augmented OCR data to a user of a financial system provides for significant improvements to the technical fields of electronic transaction data processing, data processing, data management, and user experience.

In addition, as discussed above, the disclosed method and system for providing augmented OCR data to a user of a financial system provides for the processing and storing of smaller amounts of data, i.e., more efficiently analyze OCR data and relevant financial data to generate augmented OCR data; thereby eliminating unnecessary data analysis and storage. Consequently, using the disclosed method and system for providing augmented OCR data to a user of a financial system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and for providing augmented OCR data to a user of a financial system.

The production environment 100 includes a service provider computing environment 110, a user computing environment 130, a public information computing environment 150, and a third party computing environment 140 for providing augmented OCR data, according to one embodiment. The computing environments 110, 130, 140, and 150 are communicatively coupled to each other with one or more communication channels 101, according to one embodiment.

The service provider computing environment 110 represents one or more computing systems such as a server, a computing cabinet, and/or distribution center that is configured to receive, execute, and host one or more financial systems (e.g., applications) for access by one or more users, for providing a financial document assistance to a user, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a financial system 111, which is configured to provide augmented OCR data to a user.

According to one embodiment, the financial system 111 is a personal financial management system. More particularly, the financial system 111 can be a tax return preparation system or a system that manages one or more of banking, investments, loans, credit cards, real estate investments, retirement planning, and budgeting. The financial system 111 can be a standalone system that provides augmented OCR data to a user. Alternatively, the financial system 111 may be integrated into other software or service products provided by a service provider.

The financial system 111 receives image data from a user, generates OCR data based on the image data, gathers financial data related to previously prepared financial documents, generates augmented OCR data based on the OCR data and the financial data, and provides the augmented OCR data to the user, according to one embodiment. The financial system 111 includes various components, databases, engines, modules, and/or data to support providing augmented OCR data to a user, according to one embodiment.

The financial system 111 includes a user interface module 112, a data acquisition module 114, and an analytics module 115, according to one embodiment.

The user interface module 112 guides a user through a series of financial topics by asking questions or by inviting the user to provide data related to financial topics selected by the user. In response, the user provides user data 118 and image data 117 related to an image of a financial document of the user. The financial system generates augmented OCR data related to the image data so that the user can avoid manually providing the information in the financial document to the financial system.

The user interface module 112 receives the image data 117 and the user data 118 in response to providing interview content 119, according to one embodiment. The user interface module 112 populates interview content 119 from a content pool 113, which includes a number of questions and/or financial topics that can be presented with one or more user experience elements 124, according to one embodiment. The user experience elements 124 include, but are not limited to, buttons, slides, dialog boxes, text boxes, drop-down menus, banners, tabs, directory trees, links, audio content, video content, and/or other multimedia content for receiving image data 117 and user data 118 from the user computing environment 130 and for providing questions, and augmented OCR data to the user computing environment 130, according to one embodiment.

The user computing environment 130 includes input devices 131 and output devices 132 for communicating with the user, according one embodiment. The input devices 131 include, but are not limited to, keyboards, mice, microphones, touchpads, touchscreens, digital pens, cameras, and the like. The output devices 132 include, but are not limited to, speakers, monitors, touchscreens, displays, and the like.

Returning to the financial system 111, the user interface module 112 is configured to receive the image data 117 and user data 118 from the user, according to one embodiment. The user data 118 includes information, such as, but not limited to, a name of the user, a name of the user's employer, an employer identification number (EID), a job title, an annual income, salary and wages, bonuses, a Social Security number, a government identification, a driver's license number, a date of birth, an address, a zip code, home ownership status, marital status, tax data, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, according to various embodiments.

The image data 117 relates to an image of a financial document of the user. The financial document includes information that the user wishes to provide to the financial system 111. Instead of manually entering the information from the financial document, the user captures an image of the financial document and provides image data 117 associated with the image to the financial system 111. The analytics module 115 of the financial system 111 performs OCR analysis on the image data 117 and generates OCR data 125. The OCR data 125 includes data representing the data field names of the financial document and data entries in the data fields. The field names and data entries can include the same kinds of data as the user data 118, such as, but not limited to, a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, according to various embodiments.

It is possible that the analytics module 115 will make errors when generating the OCR data 125. These errors can arise from a large number of factors such as poor hand writing in the financial document, stains on the financial document, poor quality of the captured image, crumpling or tearing of the financial document, glare in the captured image, the angle of the captured image, similarity in shape and appearance between certain typed letters or numbers, etc. Anything that obscures a portion of the financial document in the captured image can lead to errors in the OCR data 125. Such errors can result in serious consequences for the user, such as paying too much taxes, not paying enough taxes, mishandling a loan payment, mismanaging an investment, failure to receive important mail, and other real world consequences.

In order to provide more accurate OCR functionality, the data acquisition module 114 is configured to acquire additional information from various sources and to provide it to the analytics module 115 to assist in the OCR analysis. The data acquisition module 114 gathers financial data 120 in order to assist in the OCR analysis of the image data 117. The financial data 120 is data that is related to the financial document and that can provide additional context or data that the analytics module 115 can use in order to generate more accurate OCR data. For example, the data acquisition module 114 is configured to gather from various sources user related financial data 121, historical financial data 122, and finance law data 123.

The data acquisition module 114 is configured to communicate with additional service provider systems 129, e.g., a tax return preparation system, a payroll management system, or other financial management system, to access financial data, according to one embodiment. The data acquisition module 114 imports relevant portions of financial data into the financial system 111 and, for example, saves local copies into one or more databases, according to one embodiment.

In one embodiment, the additional service provider systems 129 include a tax return preparation system, and the data acquisition module 114 is configured to acquire financial data 120, for use by the financial system 111 in providing augmented OCR data to the user, according to an embodiment. Because the financial services provider provides both the financial system 111 and the additional service provider systems, the service provider computing environment 110 can be configured to share financial data between the various systems. By interfacing with the additional service provider systems 129, the data acquisition module 114 can collect financial data 120. The financial data 120 can include income data, tax return data, investment data, property ownership data, retirement account data, age data, data regarding additional sources of income, marital status, number and ages of children or other dependents, geographic location, and other data that indicates personal and financial characteristics of the user or of other users of the financial system 111 and/or the additional service provider systems 129, according to one embodiment.

In one embodiment, the additional service provider systems 129 include a payroll system that manages the payroll of a large number of employers. The data acquisition module 114 is configured to acquire information from the additional service provider systems to supply or supplement the financial data 120, for use by the financial system 111 in providing augmented OCR data, according to one embodiment. Because the financial services provider provides both the financial system 111 and the payroll system, the service provider computing environment 110 can be configured to share financial data between the various systems. By interfacing with the additional service provider systems 129, the data acquisition module 114 obtains and/or supplements the financial data 120. The information can include income data, salary data, geographic location data, numbers of exemptions claimed in a tax return, length of tenure with the employer, banking data, withholding data, investment data, and other types of data that indicate financial and personal characteristics of the employees of the employer.

The additional service provider systems 129 can include financial services other than payroll and tax return preparation systems. For example, the additional service provider systems can include personal financial management systems that manage one or more of banking, investments, credit cards, loans, retirement accounts, budgeting, or financial interests. The data acquisition module 114 can gather financial data from databases associated with the additional service provider systems 129.

The data acquisition module 114 is configured to acquire financial data from third parties, according to one embodiment. For example, the data acquisition module 114 requests and receives data from the third party computing environment 140 to supply or supplement the previous financial data 120, according to one embodiment. In one embodiment, the third party computing environment 140 is configured to automatically transmit financial data to the financial system 111 (e.g., to the data acquisition module 114), to be merged into the financial data 120. The third party computing environment 140 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

The data acquisition module 114 is configured to acquire additional financial data from the public information computing environment 150, according to one embodiment. The financial data 120 can be gathered from public record searches of tax records, public information databases, property ownership records, and other public sources of information. The data acquisition module 114 can also acquire data from sources such as social media websites, such as Twitter, Facebook, LinkedIn, and the like.

The financial system 111 uses the analytics module 115 to analyze the OCR data 125 and the financial data 120 in order to provide augmented OCR data 127 to the user. The augmented OCR data 127 represents an adjusted or updated version of the OCR data 125. In particular, the analytics module 115 can compare the OCR data 125 to the financial data 120 in order to detect possible errors in the OCR data 125, to correct potential errors in the OCR data 125, to include a notification that indicates to the user that a particular portion of the OCR data 125 may contain an error, to fill or pre-fill in electronic version of the financial document, or to provide other assistance to the user in preparing a financial document such as a tax return. The augmented OCR data 127 includes such adjustments, corrections, notifications, and/or updated or filled data fields.

The financial data 120 can include user related financial data 121. The user related financial data 121 is data that is related to the user. For example, the user related financial data 121 can include data indicating an address of the user, a name of the user, a social security number of the user, a bank account information of the user, a marital status of the user, investment data of the user, retirement data of the user, property ownership data of the user, credit information of the user loan data of the user, a user identification of the user, income data of the user, tax return data of the user, names of a spouse or children of the user, an employer of the user, an address of the employer, expense data of the user, budgeting data of the user, or other types of financial data related to the user.

The analytics module 115 can analyze the user related financial data 121 and can compare the OCR data 125 to the user related financial data 121 in order to detect possible errors or to fill vacancies in the OCR data 125. For example, in an embodiment in which the financial system 111 is a tax return preparation system, the user can capture an image of the user's W-2 form and provide the image data to the tax return preparation system. The analytics module 115 analyzes the image data related to the W-2 forms and generates OCR data that identifies the fields of the W-2 form and the user's entries in the fields of the W-2 form. The analytics module 115 then compares the OCR data 125 to the user related financial data 121 to ensure that the OCR data is compatible with the user related financial data 121. If the comparison indicates discrepancies between the OCR data 125 and the user related financial data 121, the analytics module 115 can generate augmented OCR data 127 that adjusts the OCR data 125 based on the comparison with the user related financial data 121. Alternatively, the analytics module 115 can generate augmented OCR data 127 that provides a notification that there is a question regarding a data field of the W-2 form. Alternatively, the analytics module 115 may not have been able to identify data entries in certain fields of the W-2 form as represented by the image data 117, such as an employer identification number (EIN). The analytics module 115 can retrieve the EIN from the user related financial data 121 and can generate augmented OCR data 127 that includes the EIN as indicated in the user related financial data 121.

The user related financial data 121 can include user data previously provided by the user. For example, the user related financial data 121 can represent data provided by the user to the financial system 111 in a tax return preparation interview for preparing a tax return for the user in a previous year. Alternatively, the user related financial data 121 can include data provided to the financial system 111 by the user as part of a financial management program hosted by the financial system 111. The financial management program can include a wealth management system, a budgeting system, a retirement managing system, an investment managing system, a bill pay system, a credit card management system, a loan management system, or any other kind of financial management system.

In one embodiment, the user can provide image data related to multiple financial documents. In this case, the financial data 120 can include second image data related to a second financial document provided by the user with the first image data related to the first financial document. After the analytics module 115 generates OCR data 125 related to the first financial document, the analytics module 115 can generate augmented OCR data 127 by comparing similar data entries in the first and second images in order to supply missing data entries related to the first image data or to correct erroneous data entries related to the first image data, and/or to provide a notification to the user that there may be an error in the OCR data related to the first image. For example, if the user provides first image data related to a first W-2 form and second image data related to a second W-2 forms, the analytics module 115 can analyze the first image data to generate OCR data 125. The analytics module 115 can then analyze the second image data to generate secondary OCR data 126. The analytics module 115 can compare the OCR data 125 to the secondary OCR data 126. If the analytics module 115 cannot accurately read address data in the first image data, the analytics module 115 can retrieve address data successfully recognized from the second image data and can generate augmented OCR data 127 that is an adjusted version of the OCR data 125. Alternatively, if the comparison reveals that the two images include different addresses for the user, then the augmented OCR data 127 can include a notification that the user should check to make sure that the address data is correct in both W-2 forms. Thus, the analytics module 115 can generate augmented OCR data 127 by comparing respective image data from multiple financial documents.

According to an embodiment, the financial data 120 can include historical financial data 122. The historical financial data 122 can include data related to other users of the financial system 111. For example, the financial system 111 can include financial data related to thousands or millions of previous users of the financial system 111. The historical financial data 122 can include data related to names, addresses, social security numbers, occupations, employers, marital status, bank accounts, investments, retirement funds, property ownership, credit information loans, user identifications, income, tax returns, expenses, budgeting, and other types of data associated with past users of the financial system The historical financial data 122 can also include data related to users of the additional service provider systems 129. The additional service provider systems 120 can include a tax return preparation system, a financial planning system, a wealth management system, or any other kind of the financial system. The data acquisition module 114 can gather financial data related to users of the additional service provider systems 129 to supply or supplement the historical financial data 122.

The historical financial data 122 can also include data gathered from the public information computing environment 150 in the third party computing environment 140. Thus, the historical financial data 122 can include publicly available financial data related to millions of people. Such publicly available financial data can include property records, marriage records, tax records, or other kinds of financial records that include financial data. Additionally, or alternatively, the data acquisition module 114 can gather the historical financial data 122 from third-party financial systems related to the third-party computing environment 140. The historical financial data 122 can also be gathered from social media websites, applications, or programs.

The analytics module 115 can analyze the historical financial data 122 in order to generate augmented OCR data 127. In particular, the analytics module 115 can compare the OCR data 125 to the historical financial data 122 in order to supply missing information, correct potential errors, or provide a notification to the user a possible error.

According to one embodiment, the financial system 111 generates model data 128 based on the historical financial data 122. The model data 128 can be related to a financial model. The financial model can indicate likely financial characteristics of people sharing similar geographical, occupational, or other characteristics. A user that shares some common financial and personal characteristics with previous users of the financial system 111 is likely to share further characteristics with those preparers of previous financial documents. Thus, by analyzing the user historical financial data 122 the analytics module 115 can detect inconsistencies in the OCR data 125 or can automatically populate other fields of an electronic financial document of the user based on shared characteristics between the user and previous users. The analytics module 115 thus generates augmented OCR data 127 that is more accurate and consistent.

The analytics module 115 can compare the OCR data 125 to the model data 128. If portions of the OCR data 125 do not align with the model data 128, the analytics module 115 can generate augmented OCR data 127 that adjusts the OCR data 125 based on the comparison with the model data 128. The augmented OCR data 127 can include corrections to the OCR data 125. Alternatively, the augmented OCR data 127 can include notifications highlighting possible errors in the OCR data 125. The user can then check to see that the augmented OCR data 127 is correct.

In one example, the financial system 111 is a tax return preparation system. The user captures an image of a W-2 and provides the image data 117 to the tax return preparation system. The analytics module 115 analyzes the image data 117 and generates OCR data 125. The OCR data 125 indicates that the user is a teacher from Denver, Colo. that made $89,000 in the previous tax year. The analytics module 115 compares this data to the model data 128. The model data 128 indicates that $89,000 is well outside the likely range of salaries for teachers in Denver, Colo. The analytics module 115 can generate augmented OCR data 127 that highlights the gross income field and provides an indication to the user that the user should check to see if this data entry is correct. The user can then confirm the data entry or manually change it. Alternatively, the analytics module 115 can determine that it is likely that the analytics module 115 misread $39,000 as $89,000 due to the difficulty in distinguishing between the number three and the number eight. The model data 128 can indicate that $39,000 falls in the likely range of salaries for teachers in Denver, Colo. and can generate augmented OCR data 127 in which $89,000 has been changed to $39,000. In this case, the analytics module 115 can also highlight this data entry in the augmented OCR data 127 for the user's review.

In another example, the user captures an image of a health savings account (HSA) contributions form and provides the image data to the financial system 111. When the analytics module 115 has difficulty recognizing the data entry corresponding to HSA contributions, the analytics module 115 can analyze the historical financial data 122. The historical financial data 122 indicates that employees of the user's employer typically contribute around 5% of their salary to an HSA. The analytics module generates augmented OCR data 127 that more accurately supplies the data field related to HSA contributions based on the historical financial data 122.

The financial data 120 can include finance law data 123, according to one embodiment. The finance law data can be gathered from the public information computing environment 150, the third party computing environment 140, the common store 116, or the additional service provider systems 129. The finance law data can include, for example, tax law data, financial transaction law data, laws related to banking, investments, retirement funds, or other kinds of financial laws.

In one embodiment, the analytics module 115 can generate model data 128 based on both finance law data 123 and historical financial data 122. In an example in which the financial document includes a W-2 form of the user, the analytics module 115 may compare the OCR data 125 to the model data 128 and may find that Social Security withholdings were far too high in relation to the gross income. The analytics module 115 may then conclude that an error was made by the analytics module in analyzing the gross income field and/or the Social Security withholdings field of the image data 117. The analytics module 115 can then generate augmented OCR data 127 that includes a notification that the user should check to see that these data entries are correct as recognized by the analytics module 115. The user can then manually correct the data entry via the user interface module 112 or can affirm that the analytics module 115 has correctly analyzed the image data and the changes are unnecessary. Alternatively, the analytics module 115 can generate augmented OCR data 127 that adjusts the OCR data 125 to correct an error in the OCR data 125.

When the financial system 111 provides the augmented OCR data 127 to the user, this can include outputting the augmented OCR data 127 via the user interface module 112 to the user computing environment 130. The augmented OCR data 127 can appear on the screen of a user computing device. For example, if the financial system 111 is a tax return preparation system, and after the analytics module has generated the OCR data 125 and the augmented OCR data 127 related to a W-2 form of the user, the user screen can display a W-2 form or representation of a W-2 form that includes data entries recognized from the image data 117 provided by the user. The augmented OCR data 127 provided to the user can simply include the data entries. The data entries may or may not include highlighting or other notifications indicating possible errors. The user can review the data entries and can correct them manually or accept them, as the case may be.

In one embodiment, the OCR data 125 initially generated by the analytics module 115 may never be provided to the user. Instead the analytics module 115 only provides to the user the augmented OCR data 127, which corresponds to an adjusted version of the OCR data 125. This adjusted version of the OCR data 125 can be an improved version of the OCR data 125 because it has been adjusted based on the analysis of the financial data 120.

Embodiments of the present disclosure address some of the shortcomings associated with traditional financial systems that do not adequately perform OCR analysis. A financial system in accordance with one or more embodiments provides augmented OCR data to a user based on analysis of other financial data relevant to the user. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by analyzing financial data in order to provide augmented OCR data to users, users can save money and time and can better manage their wealth and taxes.

Process

Figure 2:
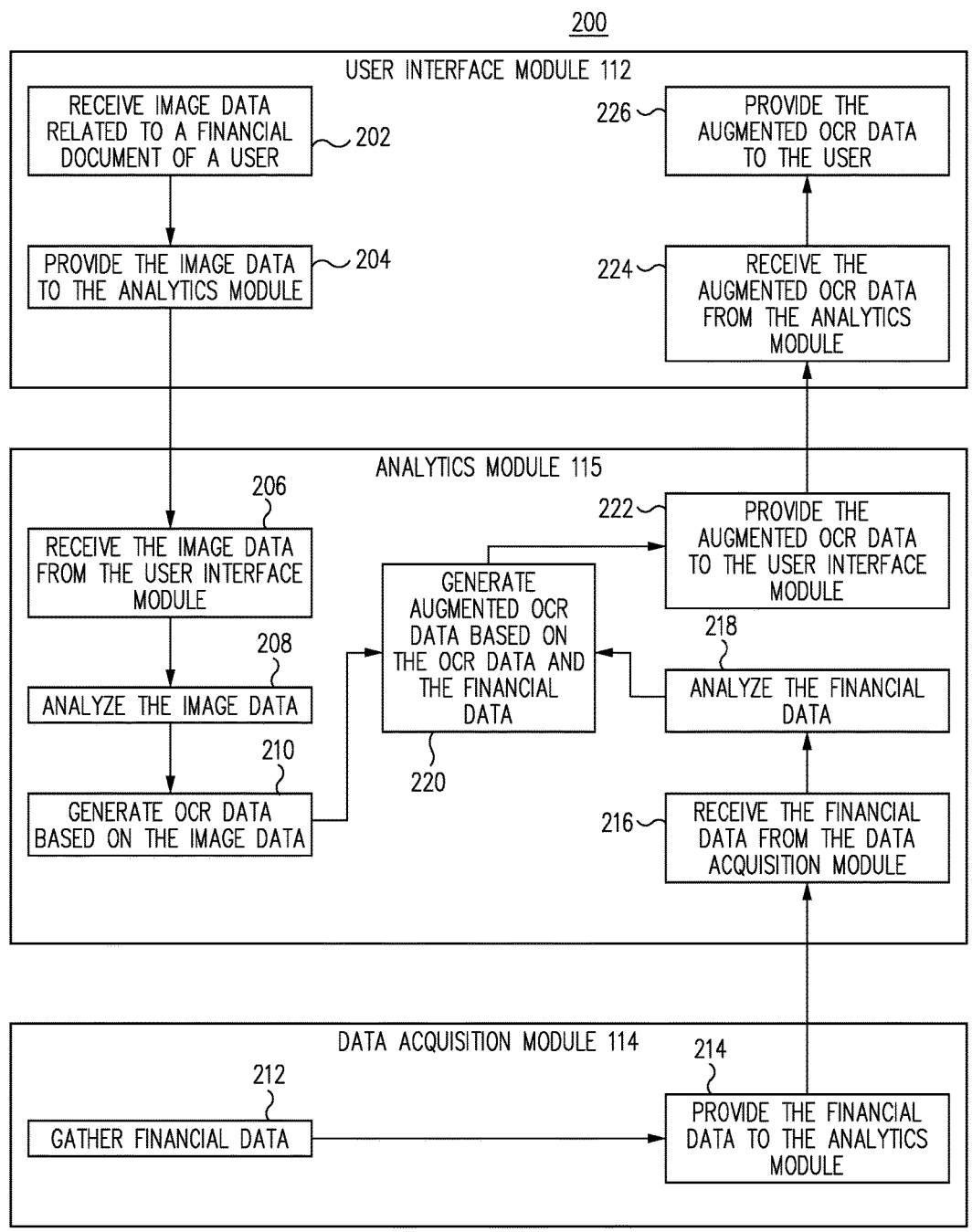
FIG. 2 is a block diagram of a process for providing augmented OCR data to a user of a financial system, in accordance with one embodiment.

FIG. 2 illustrates a functional flow diagram of a process 200 for providing augmented OCR data to a user of a financial system, in accordance with one embodiment.

At block 202, the user interface module 112 receives image data related to a financial document of a user, according to one embodiment. From block 202 the process proceeds to block 204.

At block 204, the user interface module 112 provides the image data to the analytics module 115, according to one embodiment. From block 204, the process proceeds to block 206.

At block 206, the analytics module 115 receives the image data from the user interface module 112, according to one embodiment. From block 206, the process proceeds to block 208.

At block 208, the analytics module 115 analyzes the image data, according to one embodiment. From block 208, the process proceeds to block 210

At block 210, the analytics module 115 generates OCR data based on the image data, according to one embodiment.

At block 212, the data acquisition module 114 gathers financial data, according to one embodiment. From block 212, the process proceeds to block 214.

At block 214, the data acquisition module 114 provides the financial data to the analytics module 115, according to one embodiment. From block 214, the process proceeds to block 216.

At block 216, the analytics module 115 receives the financial data from the data acquisition module 114, according to one embodiment. From block 216, the process proceeds to block 218.

At block 218, the analytics module 115 analyzes the financial data, according to one embodiment. From block 218, the process proceeds to block 220.

At block 220, the analytics module 115 generates augmented OCR data based on the OCR data and the financial data, according to one embodiment. From block 220, the process proceeds to block 222.

At block 222, the analytics module 115 provides the augmented OCR data to the user interface module 112, according to one embodiment. From block 222, the process proceeds to block 224.

At block 224, the user interface module 112 receives the augmented OCR data from the analytics module 115, according to one embodiment. From block 224, the process proceeds to block 226.

At block 226, the user interface module 112 provides the augmented OCR data to the user, according to one embodiment.

Although a particular sequence is described herein for the execution of the process 200, other sequences can also be implemented.

Figure 3:
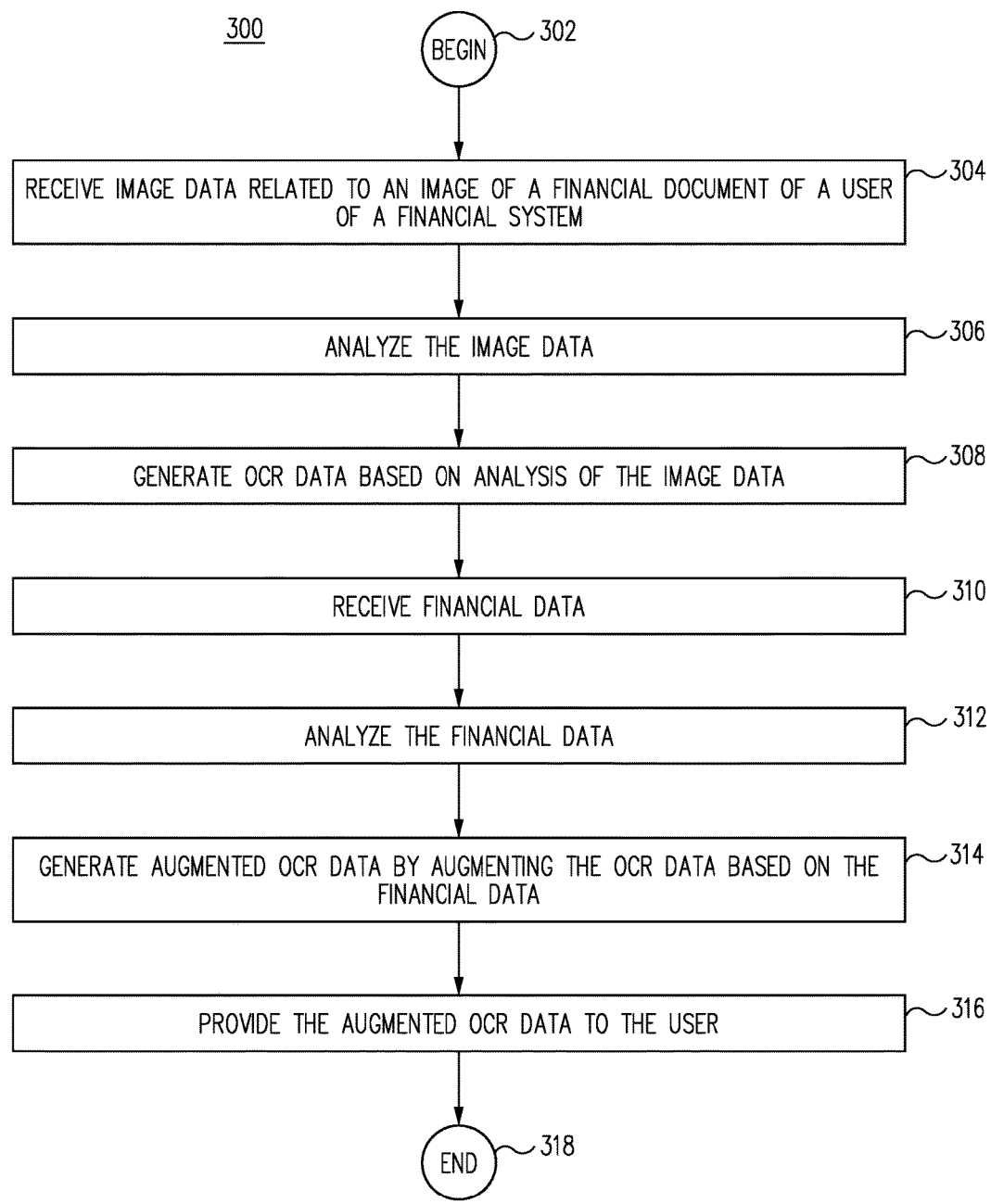
FIG. 3 is a flow diagram of a process for providing augmented OCR data to a user of a financial system, in accordance with one embodiment.

FIG. 3 illustrates a flow diagram of a process 300 for providing augmented OCR data to a user of a financial system, according to various embodiments.

In one embodiment, process 300 for providing augmented OCR data to a user of a financial system begins at BEGIN 302 and process flow proceeds to RECEIVE IMAGE DATA RELATED TO AN IMAGE OF A FINANCIAL DOCUMENT OF A USER OF A FINANCIAL SYSTEM 304.

In one embodiment, at RECEIVE IMAGE DATA RELATED TO AN IMAGE OF A FINANCIAL DOCUMENT OF A USER OF A FINANCIAL SYSTEM 304 process 300 for providing augmented OCR data to a user of a financial system receives image data related to an image of a financial document of a user of a financial system.

In one embodiment, once process 300 for providing augmented OCR data to a user of a financial system receives image data related to an image of a financial document of a user of a financial system at RECEIVE IMAGE DATA RELATED TO AN IMAGE OF A FINANCIAL DOCUMENT OF A USER OF A FINANCIAL SYSTEM 304 process flow proceeds to ANALYZE THE IMAGE DATA 306.

In one embodiment, at ANALYZE THE IMAGE DATA 306, process 300 for providing augmented OCR data to a user of a financial system analyzes the image data.

In one embodiment, once process 300 for providing augmented OCR data to a user of a financial system analyzes the image data at ANALYZE THE IMAGE DATA 306, process flow proceeds to GENERATE OCR DATA BASED ON ANALYSIS OF THE IMAGE DATA 308.

In one embodiment, at GENERATE OCR DATA BASED ON ANALYSIS OF THE IMAGE DATA 308, process 300 for providing augmented OCR data to a user of a financial system generates OCR data based on analysis of the image data, according to one embodiment.

In one embodiment, once process 300 for providing augmented OCR data to a user of a financial system generates OCR data based on analysis of the image data at GENERATE OCR DATA BASED ON ANALYSIS OF THE IMAGE DATA 308, process flow proceeds to RECEIVE FINANCIAL DATA 310.

In one embodiment, at RECEIVE FINANCIAL DATA 310 the process 300 receives financial data.

In one embodiment, once process 300 receives financial data at RECEIVE FINANCIAL DATA 310, process flow proceeds to ANALYZE THE FINANCIAL DATA 312.

In one embodiment, at ANALYZE THE FINANCIAL DATA 312 the process 300 for providing augmented OCR data to a user of a financial system analyzes the financial data.

In one embodiment, once the process 300 for providing augmented OCR data to a user of a financial system analyzes the financial data at ANALYZE THE FINANCIAL DATA 312, process flow proceeds to GENERATE AUGMENTED OCR DATA BY AUGMENTING THE OCR DATA BASED ON THE FINANCIAL DATA 314.

In one embodiment, at GENERATE AUGMENTED OCR DATA BY AUGMENTING THE OCR DATA BASED ON THE FINANCIAL DATA 314 the process 300 for providing augmented OCR data to a user of a financial system generates augmented OCR data by augmenting the OCR data based on the financial data.

In one embodiment, once the process 300 for providing augmented OCR data to a user of a financial system generates augmented OCR data by augmenting the OCR data based on the financial data at GENERATE AUGMENTED OCR DATA BY AUGMENTING THE OCR DATA BASED ON THE FINANCIAL DATA 314, process flow proceeds to PROVIDE THE AUGMENTED OCR DATA TO THE USER 316.

In one embodiment, at PROVIDE THE AUGMENTED OCR DATA TO THE USER 316 the process 300 for providing augmented OCR data to a user of a financial system provides the augmented OCR data to the user.

In embodiment, once the process 300 for providing augmented OCR data to a user of a financial system provides the augmented OCR data to the user at PROVIDE THE AUGMENTED OCR DATA TO THE USER 316, process flow proceeds to END 318.

In one embodiment, at END 318 the process for providing augmented OCR data to a user of a financial system is exited to await new data and/or instructions. As noted above, the specific illustrative examples discussed above are but illustrative examples of implementations of embodiments of the method or process for providing augmented OCR data to a user. Those of skill in the art will readily recognize that other implementations and embodiments are possible. Therefore the discussion above should not be construed as a limitation on the claims provided below.

In one embodiment, a computing system implemented method for providing augmented OCR data to a user of a financial system includes receiving image data related to an image of a financial document of a user of a financial system, analyzing the image data, and generating OCR data based on analysis of the image data. The method further includes receiving financial data, analyzing the financial data, generating augmented OCR data by augmenting the OCR data based on the financial data, and providing the augmented OCR data to the user.

In one embodiment, a non-transitory computer-readable medium includes a plurality of computer-executable instructions which, when executed by a processor, perform a method for providing augmented OCR data to a user of a financial system. The instructions include a user interface module configured to receive image data related to an image of a financial document of a user of a financial system, and a data acquisition module configured to gather financial data related to the financial document. The instructions further include an analytics module configured to analyze the image data, to generate OCR data based on the image data, to analyze the financial data, and to generate augmented OCR data based on the OCR data and the financial data. The user interface module is configured to output the augmented OCR data to the user.

In one embodiment, a system for providing augmented OCR data to a user of a financial system includes at least one processor and at least one memory coupled to the at least one processor, the at least one memory having stored therein instructions which, when executed by any set of the one or more processors, perform a process. The process includes receiving, with a user interface module of a computing system, image data related to an image a financial document of a user of a financial system, analyzing, with an analytics module of a computing system, the image data, and generating, with the analytics module of the computing system, OCR data based on analysis of the image data. The process further includes receiving, with a data acquisition module of a computing system, financial data, analyzing, with the analytics module, the financial data, generating, with the analytics module, augmented OCR data by augmenting the OCR data based on the financial data, and providing, with the user interface module, the augmented OCR data to the user.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing augmented OCR data to a user of a financial system, the system comprising:
    at least one processor; and
    at least one memory coupled to the at least one processor, the at least one memory having stored therein instructions which, when executed by the at least one processors, perform a process including:
    receiving, with a user interface module of a computing system, image data related to an image a financial document of a user of a financial system;
    analyzing, with an analytics module of a computing system, the image data;
    generating, with the analytics module of the computing system, OCR data based on analysis of the image data;
    receiving, with a data acquisition module of a computing system, financial data, wherein the financial data includes user related financial data associated with the user, wherein receiving financial data includes receiving second image data related to a second image of a second financial document of the user;
generating second OCR data based on analysis of the second image data;
analyzing, with the analytics module, the financial data by at least analyzing the second image data;
generating, with the analytics module, augmented OCR data by augmenting the OCR data based on the financial data by at least comparing the OCR data to the second OCR data and further adjusting the OCR data based on the second OCR data by at least importing a data entry from the second OCR data to the OCR data; and
providing, with the user interface module, the augmented OCR data to the user.

2. The system of claim 1, wherein the user related financial data corresponds to user data previously provided by the user.

3. The system of claim 1, wherein generating the augmented OCR data includes adding a notification to the OCR data indicating a possible error in the OCR data.

4. The system of claim 1, wherein the financial system is a tax return preparation system.

5. The system of claim 4, wherein the financial document is a tax related document.

6. The system of claim 1, wherein the financial system manages one or more of investments, banking, credit cards, loans, budgeting, retirement funds, stock trading, or bill pay of the user.

7. The system of claim 1, wherein the financial data includes finance law data.

8. The system of claim 7, wherein finance law data includes tax law data.

9. The system of claim 1, wherein receiving financial data includes receiving financial data from a third party database.

10. The system of claim 1, wherein receiving financial data includes receiving financial data from a government database.

11. The system of claim 1, wherein receiving financial data includes receiving financial data from a social media website or software application.

12. The system of claim 1, wherein the process further includes capturing the image data with a camera associated with a computing device of the user.

13. The system of claim 12, wherein providing the augmented OCR data includes displaying the augmented OCR data on the computing device of the user.

14. A computing system implemented method for providing augmented OCR data to a user of a financial system, the method comprising:
receiving image data related to an image of a financial document of a user of a financial system;
analyzing the image data;
generating OCR data based on analysis of the image data, wherein generating the augmented OCR data includes:
comparing the OCR data to the financial model data; and
adjusting the OCR data based on the financial model data by at least adding a notification to the OCR data indicating a possible error in the OCR data;
receiving financial data by at least receiving second image data related to a second image of a second financial document of the user and wherein analyzing the financial data includes analyzing the second image data;
analyzing the financial data by at least analyzing the second image data;
generating augmented OCR data by augmenting the OCR data based on the financial data by at least comparing the OCR data to the second OCR data and further adjusting the OCR data based on the second OCR data by at least importing a data entry from the second OCR data to the OCR data; and
providing the augmented OCR data to the user.

15. The method of claim 14, wherein the financial data includes user related financial data associated with the user.

16. The method of claim 15, wherein the user related financial data corresponds to user data previously provided by the user.

17. The method of claim 14, wherein analyzing the financial data includes generating financial model data based on the financial data.

18. The method of claim 14, wherein the financial data includes historical financial data related to previous users of the financial system.

19. The method of claim 14, wherein the financial system is a tax return preparation system.

20. The method of claim 19, wherein the financial document is a tax related document.

21. The method of claim 20, wherein the financial data includes previously prepared tax return data related to a previously prepared tax return.

22. The method of claim 14, wherein the financial data includes finance law data.

23. The method of claim 14, wherein receiving financial data includes receiving financial data from a third party database.

24. The method of claim 14, wherein receiving financial data includes receiving financial data from a government database.

25. A system for providing augmented OCR data to a user of a financial system, the system comprising:
at least one processor; and
at least one memory coupled to the at least one processor, the at least one memory having stored therein instructions which, when executed by any set of the one or more processors, perform a process including:
receiving, with a user interface module of a computing system, image data related to an image a financial document of a user of a financial system;
analyzing, with an analytics module of a computing system, the image data;
generating, with the analytics module of the computing system, OCR data based on analysis of the image data wherein generating the augmented OCR data includes:
comparing the OCR data to the financial model data; and
adjusting the OCR data based on the financial model data wherein adjusting the OCR data includes adding a notification to the OCR data indicating a possible error in the OCR data;
receiving, with a data acquisition module of a computing system, financial data;
analyzing, with the analytics module, the financial data, wherein analyzing the financial data includes generating financial model data based on the financial data;
generating, with the analytics module, augmented OCR data by augmenting the OCR data based on the financial data; and
providing, with the user interface module, the augmented OCR data to the user.

26. The system of claim 25, wherein the notification prompts the user to review a selected data field of the augmented OCR data.

27. The system of claim 25, wherein the financial data includes historical financial data related to previous users of the financial system.

28. The system of claim 27, wherein generating financial model data includes generating a financial model based on previous users sharing one or more characteristics with the user.

29. The system of claim 28, wherein the characteristics include one or more of an employer, an area of residence, an occupation, an income, a marital status, a number of dependents, financial characteristics, and tax history.

30. The system of claim 29, wherein generating the augmented OCR data includes adjusting one or more data fields of the OCR data.

31. The system of claim 30, wherein the data fields include one or more of an address, an income, a tax withholding, a marital status, a name of the user, a name of a spouse of the user, an employer, an employer identification, a user identification, a date, a social security number, and a driver's license number.

* * * * *